US 6,562,910 B2

(12) United States Patent
Righettini

(10) Patent No.: US 6,562,910 B2
(45) Date of Patent: May 13, 2003

(54) TRIFUNCTIONAL OLEFINIC-CAPPED POLYMERS AND COMPOSITIONS THAT INCLUDE SUCH POLYMERS

(75) Inventor: Robin F. Righettini, Apex, NC (US)

(73) Assignee: Lord Corporation, Cary, NC (US)

( * ) Notice: Subject to any disclaimer, the term of this patent is extended or adjusted under 35 U.S.C. 154(b) by 27 days.

(21) Appl. No.: 10/224,885

(22) Filed: Aug. 21, 2002

(65) Prior Publication Data
US 2003/0032732 A1 Feb. 13, 2003

Related U.S. Application Data

(62) Division of application No. 09/330,731, filed on Jun. 11, 1999, now Pat. No. 6,444,757.

(51) Int. Cl.⁷ .............................................. C08F 265/04
(52) U.S. Cl. ..................... 525/302; 525/54.3; 525/54.4; 525/59; 525/293; 525/330.3; 525/331.9; 525/440; 525/445; 525/479; 526/279; 526/310; 526/313; 526/320; 526/328; 526/332; 526/335

(58) Field of Search ................. 525/54.3, 54.4, 525/59, 293, 302, 330.3, 331.9, 440, 445, 479; 526/279, 310, 313, 320, 328, 332, 335

(56) References Cited

U.S. PATENT DOCUMENTS 3,092,611 A * 6/1963 Lynn ........................ 260/78.4

* cited by examiner

Primary Examiner—Helen L. Pezzuto
(74) Attorney, Agent, or Firm—Miles B. Dearth

(57) ABSTRACT

A polymer having at least one reactive terminal or pendant functional group that has been capped with a trifunctional olefinic compound. The polymer can be made by contacting a base polymer having at least one reactive terminal or pendant functional group with a trifunctional olefinic compound under conditions effective to react at least one of the terminal or pendant functional groups with the trifunctional olefinic compound. The capped polymers are particularly suitable as crosslinking toughening agents in multi-components compositions such as adhesives, coatings and matrices for composites.

17 Claims, No Drawings

TRIFUNCTIONAL OLEFINIC-CAPPED POLYMERS AND COMPOSITIONS THAT INCLUDE SUCH POLYMERS

This application is a divisional of U.S. patent application Ser. No. 09/330,731, filed Jun. 11, 1999 now U.S. Pat. No. 6,444,757 B1.

BACKGROUND OF THE INVENTION

The present invention relates to useful polymers that are capped by trifunctional olefinic moieties that include at least one ester group, particularly benzylidenecyanoacetates.

It is well known to include toughening agents (also known as impact modifiers or flexibilizers) in polymeric compositions in order to provide improved impact and shatter resistance to, and decreases the brittleness of, the cured polymeric composition. For example, the use of elastomers in structural adhesives to improve low temperature properties, such as impact resistance, is well known. Toughening agents are also used in plastics such as polystyrene, poly(butylene terephthalate) and polyacetal and fibers such as aramid and nylon.

In particular, P.C.T. Publication WO 97/39074 discloses the use of at least one polymeric material which can act as a toughening agent in an acrylic adhesive such as polychloroprene, polymer-in-monomer syrup, chlorosulfonated polyethylene rubber, copolymers of butadiene and at least one monomer copolymerizable therewith, for example, styrene, acrylonitrile, methacrylonitrile (e.g. poly (butadiene-(meth)acrylonitrile or poly(butadiene-(meth) acrylonitrile-styrene) and mixtures thereof; as well as modified elastomeric polymeric materials, such as butadiene homopolymers and copolymers as noted above modified by copolymerization therewith of trace amounts of up to about 5 percent by weight of the elastomeric material of at least one functional monomer (such as acrylic acid, methacrylic acid, maleic anhydride, fumaric acid, styrene, and methyl methacrylate to give, for example, methacrylate-terminated polybutadiene homopolymers and/or copolymers).

U.S. Pat. No. 4,769,419 ("the '419 patent") discloses structural adhesive compositions for metal-metal bonding applications. The adhesives include as tougheners olefinic terminated liquid rubbers that are reacted with monoisocyanate compounds. The '419 patent further describes acrylic adhesives with olefinic monomer, olefinic urethane reaction product of an isocyanate-functional prepolymer and a hydroxy-functional monomer, phosphorus-containing compounds, an oxidizing agent and a free radical source.

U.S. Pat. No. 5,641,834 ("the '834 patent") and U.S. Pat. No. 5,710,235, both incorporated herein by reference, disclose adhesives that include as tougheners an olefinic-terminated polyalkadiene that includes carboxy ester linking groups and at least one nascent secondary hydroxyl group that is capped with a monoisocyanate. The composition also includes a free radical-polymerizable monomer such as an olefinic monomer and, optionally, a second polymeric material. In a preferred embodiment the composition is an adhesive that also includes a phosphorus-containing compound and an ambient temperature-active redox catalyst.

The '834 patent and the '419 patent are examples of capping oligomers with (meth)acrylate groups. Such oligomers are susceptible to homopolymerization and, thus, require the presence of an inhibitor for shelf-life stability. These inhibitors increase expense, complication and cause discoloration. Air, which contains oxygen—a powerful inhibitor, is often used to stabilize such oligomers. The use of air has several disadvantages. First, it can react with some oligomeric backbones—especially polydienes that contain residual unsaturation. This can result in molecular weight increase, peroxide formation that leads to instability, and discoloration. Storage in bulk can be problematic, as it is difficult to introduce air into the center of a large container. The pumps, sparge tubes and venting needed to introduce air into a system add complication and expense. It would be useful to have easily-prepared capped reactive oligomers that are not capable of homopolymerization.

The use of crosslinkers in polymeric compositions also is well known. Crosslinkers can provide solvent resistance, heat resistance, dimensional stability and resistance to weathering. The most common crosslinker for styrenic compositions is divinyl benzene, although unsaturated polyesters and di-, tri- and poly(meth)acrylates are also effective. A crosslinker that cures styrenic compositions faster than known crosslinkers would be very useful.

SUMMARY OF THE INVENTION

According to the invention there is provided a polymer having at least one reactive terminal or pendant functional group that has been capped with a trifunctional olefinic compound. There also is provided a method for making a polymer that includes contacting a base polymer having at least one reactive terminal or pendant functional group with a trifunctional olefinic compound under conditions effective to react at least one of the terminal or pendant functional groups with the trifunctional olefinic compound.

The capped polymer according to the invention provides a low cost polymer that is reactive with common olefinic monomers such as styrenic monomers at an increased reaction rate compared to other capped polymers. The end group or moiety resulting from the capping agent is incapable of homopolymerization thus eliminating some of the complications caused by oxidation of the base polymer as well as the requirements for inhibitors. In addition, the capped polymer can be made under anaerobic conditions since an air inhibitor is not required. Curing of compositions that include the capped polymer of the invention can be done aerobically or anaerobically, but anaerobically is preferred. Moreover, the capped polymer of the invention is stable in the presence of benzoyl peroxide, a common oxidizing agent.

Trifunctional olefinic compounds that include only one ester group bonded to one of the unsaturated carbon atoms are especially useful for capping. Such single ester compounds allow for capping of substantially all the reactive groups of the base polymer without chain extension or the formation of molecules containing more than one base polymer residue. Such capping avoids the viscosity increase problem associated with chain extension of the base polymer thus allowing for the production of a low viscosity capped polymer.

The capped polymers described above are particularly suitable as crosslinking toughening agents in multi-components compositions such as adhesives, coatings and matrices for composites. As a toughening agent, the capped polymer provides improved impact and shatter resistance to, and decreases the brittleness of, the cured adhesive, coating or matrix material. One useful application is a reactive adhesive that also includes at least one curable component, preferably a free radical curable ethylenically unsaturated compound.

DETAILED DESCRIPTION OF THE PREFERRED EMBODIMENTS

Unless otherwise indicated, description of components in chemical nomenclature refers to the components at the time of addition to any combination specified in the description, but does not necessarily preclude chemical interactions among the components of a mixture once mixed.

As used herein, the following terms have certain meanings.

"Pendant group" means a functional group that is pendant to a polymer backbone chain.

"Polymer" also includes lower molecular weight oligomers such as dimers, trimers and tetramers.

"Room temperature" means ambient workplace (manufacturing or assembly plant, laboratory, etc.) temperature range, typically 10–40° C., more typically 20–30° C.

"Terminal group or position" means a functional group occupying the terminal position of a polymer backbone chain or the terminal position of a chain pendant to a polymer backbone chain.

The ester-containing trifunctional olefinic compounds include olefinic or ethylenic unsaturation and at least three functional groups that are each bonded directly to the unsaturated carbon atoms. As used in the context of "trifunctional", "functional group" includes alkyl as well as the various functional groups conventionally referred to in the organic chemical art. One of the functional groups is an ester having the structure —COOR$^1$ (i.e., carboalkoxy or carboxylic ester). Preferably, the other functional groups are not an ester. Preferably, the trifunctional olefinic compounds are electrophilic.

Useful trifunctional olefinic compounds typically have a generic structure represented by formula A

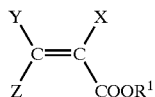

wherein X is an electron withdrawing group such as —SO$_2$R$^1$, —CN, SO$_2$Ar, —(C=O)R$^2$, and halogen (wherein Ar is an aryl or substituted aryl group; R$^2$ is an alkyl, —N(H)R$^1$, or —NH$_2$); Y is —R$^1$, —Ar or an electron withdrawing group as identified for X; Z is a moiety selected from the first or second row elements of the Periodic Chart in the form of either a single element (such as —H or —F) or linearly bonded multiple elements (such as —CN); and R$^1$ is an alkyl, alkoxy, alkyl ether, alkenyl, alkyl ester, amino, alkylamino, alkylimino, or alkylamimidoyl. Both unsaturated carbon atoms of the trifunctional olefinic monomer are sterically hindered by the functional groups. Preferably, X is —CN; Y is —CN, or —Ar; Z is hydrogen; and R$^1$ is a primary or secondary linear or branched alkyl having 1 to 18 carbon atoms. "Primary" alkyl means that the carbon atom of R$^1$ bonded to —OOC— is also bonded to only one non-hydrogen atom (thus, it is bonded to two hydrogen atoms). "Secondary" alkyl means that the carbon atom of R$^1$ bonded to —OOC— is also bonded to two non-hydrogen atoms (thus, it is bonded to only one hydrogen atom).

Illustrative trifunctional olefinic compounds include arylidenecyanoacetates such as benzylidenecyanoacetate (i.e., ester of benzylidenecyanoacetic acid); alkylidenecyanoacetates such as ethylidenecyanoacetate; arylideneacetoacetates such as benzylidineacetoacetate; esters of tricyanoacrylic acid; esters of β-halocyanoacrylic acids; and esters of 2-halo-2-cyanoacrylic acid. Benzylidenecyanoacetates having a generic structure represented below by formula B are particularly preferred.

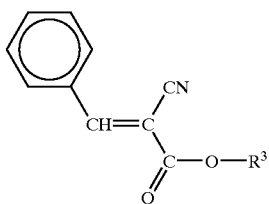

wherein R$^3$ is a linear or branched alkyl, alkoxy, alkyl ether, alkenyl, alkyl ester, amino, alkylamino, alkylimino, or alkylamimidoyl. Preferably, R$^3$ is an alkyl or alkyl ether, particularly one having 1 to 18 carbon atoms. Methyl, ethyl, n-butyl, n-hexyl, 2-ethylhexyl, n-propyl, isopropyl, allyl, iso-octyl, 2-methoxyethyl, 2-ethoxyethyl, 2-methoxy-2-propyl and 2-ethoxy-2-propyl are particularly preferred for R$^3$. Benzylidenecyanoacetates are identified herein according to the R$^3$ group. Thus, if R$^3$ is methyl then the benzylidenecyanoacetate is referred to as "methyl benzylidenecyanoacetate".

Arylidenecyanoacetates, alkylidenecyanoacetates and arylideneacetoacetates can be made via catalyzed Knoevenagel condensation of aldehydes with cyanoacetates or acetoacetates as described in Gilath et al, *J. Appl. Poly Sci.*, 14, 1491 (1970). This condensation reaction typically is performed in a conventional solvent such as hexane, cyclohexane, heptane, octane, benzene, toluene, xylene, ethanol and propanol. The catalyst usually is a base capable of removing a proton from the cyanoacetate. Examples include piperidine, mixture of piperidine with acetic acid, pyridine, diethyl amine, propyl amine, potassium hydroxide, triethyl amine and butyl lithium. The reaction temperature typically is controlled by the boiling point of the solvent. Water is evolved in this reaction, and it may or may not be removed by distillation. The exotherm, if any, can be controlled by the slow addition of one of the reactants.

The trifunctional olefinic compound can cap any polymer that has a hydroxyphenyl, hydroxy or amino reactive functional group in a terminal or pendant position. The hydroxyphenyl, hydroxy or amino functional groups should be free of significant steric hindrance.

The trifunctional olefinic compound is combined with the polymer under conditions effective for reacting the trifunctional olefinic compound with the respective reactive functional group of the polymer to form a capped polymer having the generic structure:

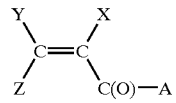

wherein X, Y and Z are the same as in formula A above and A is a polymer backbone structure. In other words, A is the base polymer backbone residue resulting from the reaction with the trifunctional olefinic compound. The base polymer, or course, can include more than one reactive functional group. All, substantially all, or only a portion of the reactive functional groups of the base polymer can be capped according to the invention. Accordingly, there can be more than one capping moiety on the capped polymer. The degree of capping can be controlled by the relative reaction amounts of the trifunctional olefinic compound and the base polymer and/or the reaction conditions.

The trifunctional olefinic compounds are particularly useful in capping polymers that have hydroxy terminal or pendant groups. The trifunctional olefinic compounds can be reacted with such hydroxy-functional polymers via transesterification or directed esterification in the presence of a catalyst and heat.

Examples of hydroxy-functional polymers that can be capped according to the invention include hydroxy-terminated polymers such as polyether polyols, hydroxy-terminated dienes, hydroxy-terminated silicones and hydroxy-terminated polyesters and hydroxy-side chain polymers such as polymers and copolymers of 2-hydroxy (meth) acrylate, poly(vinyl alcohol), poly(vinyl acetals), poly(vinyl phenol), cellulose, chitin and oligomerized castor oil. Illustrative polyether polyols include ethylene oxide-capped poly (propylene oxide), poly(tetramethylene glycol) and other hydroxy-terminated oligomers and polymers of ethylene oxide, propylene oxide and tetrahydrofuran. Illustrative hydroxy-terminated dienes include hydroxy-terminated polybutadiene, hydroxy-terminated poly(butadiene-acrylonitrile) and hydroxy-terminated poly(butadiene-methacrylonitrile-acrylic acid).

Illustrative catalysts for the transesterification reaction include tin catalysts such as dibutyl tin oxide and dibutyl tin dilaurate; titanium catalysts such as $Ti(OBu)_4$ ("Bu" is butyl); and oxides, carbonates and acetates of zinc, calcium, magnesium and cobalt. The transesterification reaction typically is performed at 90 to 200° C., preferably 110 to 140° C. The trifunctional olefinic compound can be reacted in any amount relative to the amount of the base polymer sufficient to achieve the desired amount of capping. The desired amount of capping typically can be controlled by adjusting the mole ratio of the trifunctional olefinic compound relative to the moles of hydroxyl, amino or hydroxylphenyl reactive groups in the base polymer. In the instance of benzylidenecyanoacetate, the mole ratio of benzylidenecyanoacetate to base polymer reactive groups preferably is 0.05 to 1.10, more preferably 0.80 to 1.00.

The capped polymer of the invention preferably is a liquid at room temperature in order to increase the ease of formulating it into a multi-component composition. However, the capped polymer can be a solid at room temperature and be formulated into a multi-component composition by dissolving or dispersing it in a solvent.

The capped polymer can be used in any curable system that also includes a polymerizable or curable component such as an ethylenically unsaturated compound. It is particularly useful in free radical polymerizable or curable systems, such as described in U.S. Pat. Nos. 2,981,650; 3,321,351; 3,890,407; 4,223,115; 4,293,665; 4,467,071; 4,452,944; 4,536,546; 5,206,288; 4,769,419 and 5,859,160. Such free radical polymerizable systems include a curable component that includes at least one of a free radical polymerizable ethylenically unsaturated monomer characterized by the presence of a —C=C— group, a polymer derived from such monomer, or mixtures of monomer and polymer. Particularly preferred unsaturated monomers/polymers include styrenic compounds. Other ethylenically unsaturated monomer classes can be used, but they are preferably used in a mixture with at least one styrenic compound. Such additional monomer classes include (meth) acrylic compounds; maleate esters; fumarate esters; vinyl esters such as vinyl acetate; vinyl ethers such as butyl vinyl ether, isobutyl vinyl ether, ethylene glycol monovinyl ether, octadecyl vinyl ether, 2-ethylhexyl vinyl ether, diethylene glycol divinyl ether and cyclohexane dimethanol divinyl ether; conjugated dienes such as 2,3-dichloro-1,3-butadiene and 2-chloro-1,3-butadiene; itaconic acid and esters thereof; and vinylidene halides.

As used herein "styrenic compound" means a styrenic monomer or a polymer that is made from a styrenic monomer. "Styrenic monomer" means styrene per se and styrenes substituted with additional functional groups. Illustrative styrenic monomers include styrene, 2-vinyl toluene, 3-vinyl toluene, 4-vinyl toluene, p-acetoxy styrene, chloromethyl styrene, ethyl styrene, divinyl benzene, 2-fluorostyrene, 3-fluorostyrene, 4-fluorostyrene, 2-chlorostyrene, 3-chlorostyrene, 4-chlorostyrene, 2-bromostyrene, 3-bromostyrene, 4-bromostyrene, 2,3,4,5,6-pentafluorostyrene, 4-vinyl benzoic acid, esters of 4-vinyl benzoic acid, 9-vinylanthracene, 4-methoxystyrene, 4-ethoxystyrene, 4-vinylbiphenyl, 2,4-dimethylstyrene, 4-vinylaniline, 4-cyanostyrene and glycidyl vinylbenzyl ether. Styrene, 2-vinyl toluene, 3-vinyl toluene, 4-vinyl toluene and mixtures thereof are preferred.

As used herein, "(meth)acrylic compound" means a (meth)acrylic monomer or a polymer that is made from a (meth)acrylic monomer. "(Meth)acrylic monomer" means acrylic acid, methacrylic acid or an amide, ester, salt or nitrile thereof. Representative (meth)acrylic monomers include, but are not limited to, methyl methacrylate, ethyl methacrylate, butyl methacrylate, methyl acrylate, butyl acrylate, cyclohexyl acrylate, hexyl acrylate, 2-ethylhexyl acrylate, lauryl acrylate, ethyl acrylate, diethylene glycol dimethacrylate, dicyclopentadienyloxyethyl methacrylate, 2-ethylhexyl methacrylate, hexyl methacrylate, cyclohexyl methacrylate, lauryl methacrylate, tetrahydrofuryl methacrylate, methacrylic acid, acrylic acid, acrylonitrile, methacrylonitrile, glycidyl methacrylate, cyanoacrylate, acrylamide and methacrylamide.

The adhesive compositions of the invention preferably are substantially 100% reactive. In other words, all components of the adhesive react during curing and thus there is no volatilization of organic compounds. In particular, the capping moiety of the invention is reactive with the ethylenically unsaturated compound or monomer. The result is a graft copolymer network whose structure is characterized as having hard polymer chains resulting from the ethylenically unsaturated monomer that are crosslinked by soft or rubber polymer chains resulting from the capped polymer. Preferably or alternatively, the adhesive is substantially free of volatile organic compounds as solvents (less than one weight percent, based on the total amount of the adhesive composition). As explained below, reactive diluents are used rather than volatile solvents. If desired, volatile solvents can be used to reduce viscosity or allow greater penetration into porous substrates.

Adhesive compositions that include the trifunctional olefinic compound-capped polymer of the invention should include a diluent that is reactive with the trifunctional olefinic compound capping moiety. However, reaction of the reactive diluent with the trifunctional olefinic compound-capped polymer also contributes to the adhesive strength and curing of the adhesive. The reactive diluent also can be at least a part of the polymerizable component of the adhesive. Useful polymerizable monomers that can serve both reactive diluent and polymerizable component functions include styrenic monomers and the other ethylenically unsaturated monomers described above as well as (meth)acrylic monomers.

Compositions can include in addition to the capped polymer of the invention at least one other polymeric material, preferably an elastomer, which can act as a toughening agent. The polymeric material may or may not include an ethylenically unsaturated structure that is capable of reacting with at least one of the ethylenically unsaturated monomers described above. The polymeric material can be, for example, polychloroprene as described in U.S. Pat. No. 2,981,650; a polymer-in-monomer syrup as described in U.S. Pat. Nos. 3,725,504 and 4,223,115; butadiene-based elastomers and urethane-modified butadiene-based elastomers as described in U.S. Pat. Nos. 4,223,115; 4,452,944; 4,769,419 and 5,641,834; chlorosulfonated polyethylene rubbers and/or a mixture of sulfonyl chloride with chlorinated polyethylene as described in U.S. Pat. Nos. 3,890,407, 5,206,288 and 4,536,546; and olefinic urethane reaction products of an isocyanate-functional prepolymer and a hydroxy-functional monomer as described in U.S. Pat. Nos. 4,223,115, 4,452,944, 4,467,071, and 4,769,419.

Polymer-in-monomer syrups are well known in the art. The monomer can be any of the ethylenically unsaturated monomers described above. The monomer of the polymer-in-monomer syrup can itself serve as the polymerizable component of the composition or a pre-formed polymer-in-monomer syrup can be mixed with an ethylenically unsaturated monomer. Exemplary polymer-in-monomer syrups are described in U.S. Pat. Nos. 3,725,504 and 4,223,115.

Representative liquid olefinic-terminated elastomers include homopolymers of butadiene; copolymers of butadiene and at least one monomer copolymerizable therewith, for example, styrene, acrylonitrile, methacrylonitrile; as well as modified elastomeric polymeric materials, such as butadiene homopolymers and copolymers as noted above modified by copolymerization therewith of trace amounts or up to about 5 percent by weight of the elastomeric material of at least one functional monomer (such as acrylic acid, methacrylic acid, maleic anhydride, fumaric acid, styrene and methyl methacrylate). The secondary hydroxyl group of liquid butadiene-based elastomers can be reacted with an isocyanate to form a liquid urethane-modified butadiene elastomer as described in U.S. Pat. Nos. 4,769,419 and 5,641,834.

Other useful elastomers include a homopolymer or copolymer of epichlorohydrin and ethylene oxide and copolymers of ethylene and acrylate esters, such as methyl acrylate and ethyl acrylate, wherein the copolymer contains at least 30 weight percent acrylate ester that are available from E. I. du Pont under the tradename VAMAC.

The chlorosulfonated polyethylene and sulfonyl chloride/chlorinated polyethylene mixture embodiments can have a chlorine content of 25 to 67 weight percent and 3 to 160 mmols sulfonyl chloride moiety per 100 grams of polymer. Further, the polyethylene from which the chlorosulfonated polyethylene is made preferably has a melt index of 4 to 500.

A particularly preferred adhesive system is a room temperature-curable structural adhesive that includes
(a) 10–90, preferably 20–70, weight percent of an ethylenically unsaturated monomer selected from the group consisting of vinyl esters; vinyl ethers; conjugated dienes; styrenic monomers and vinylidene halides;
(b) 10–80, preferably 20–50, weight percent of the capped polymer of the invention;
(c) 0–40, preferably 1–25, weight percent of an olefinic urethane reaction product of an isocyanate-functional prepolymer and a hydroxy-functional monomer having at least one unit of polymerizable unsaturation, such reaction product being characterized by the presence of at least two units of unsaturation and the substantial absence of free isocyanate products;
(d) 0–20, preferably 2–10, weight percent of a phosphorus-containing compound having one or more olefinic groups and no less than one P—OH group; and
(e) a room temperature-active initiator system that includes at least one reducing agent and at least one oxidizing agent that are co-reactive at room temperature to generate free radicals that are capable of initiating and propagating the cure of said adhesive composition,
wherein the weight percents are based on the total weight of components (a)–(d).

The free radical-polymerizable adhesive compositions of the invention are normally provided as two-part or package systems, with the parts being mixed or contacted at the time of use to provide a free radical curing adhesive. In more detail, these two-part systems can include
(I) a first part or side comprising
(a) 10–90, preferably 20–70, weight percent of an ethylenically unsaturated monomer selected from the group consisting of vinyl esters; vinyl ethers; conjugated dienes; styrenic monomers; and vinylidene halides;
(b) 10–80, preferably 20–50, weight percent of the capped polymer of the invention;
(c) 0–40, preferably 1–25, weight percent of an olefinic urethane reaction product of an isocyanate-functional prepolymer and a hydroxy-functional monomer having at least one unit of polymerizable unsaturation, such reaction product being characterized by the presence of at least two units of unsaturation and the substantial absence of free isocyanate products;
(d) 0–20, preferably 2–10, weight percent of a phosphorus-containing compound having one or more olefinic groups and no less than one P—OH group; and
(e) 0.05–10, preferably 0.1–6, weight percent of at least one reducing agent which is interactive with a peroxide oxidizing agent to produce free radicals which are capable of initiating and propagating free radical polymerization reactions; and
(II) a second part or side comprising
a bonding activator containing a peroxide oxidizing agent of a room temperature-active redox couple initiator system, the peroxide oxidizing agent being reactive at room temperature with agent (e) when the first and second parts are mixed to produce free radicals which are capable of initiating and propagating free radical polymerization, the amount of the peroxide oxidizing agent being sufficient to interact with agent (e).

Phosphorus-containing compounds that enhance metal adhesion as well as slow cure rate can be any derivative of phosphinic acid, phosphonic acid or phosphoric acid having at least one P—OH group and at least one organic moiety characterized by the presence of an olefinic group, which is preferably terminally located. A listing of such phosphorus compounds is found in U.S. Pat. No. 4,223,115. A preferred phosphorus-containing compound has a structure that may be represented by the formula

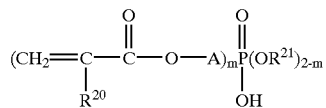

wherein $R^{20}$ is selected from the group consisting of hydrogen, an alkyl group having from one to 8, preferably one to 4, carbon atoms, and $CH^2=CH-$; $R^{21}$ is selected from the group consisting of hydrogen, an alkyl group having from one to 8, preferably one to 4 carbon atoms; A is selected from the group consisting of —$R^{22}$O— and ($R^{23}$O)$_n$, wherein $R^{22}$ is an aliphatic or cycloaliphatic alkylene group containing from one to 9, preferably 2 to 6, carbon atoms; $R^{23}$ is an alkylene group having from one to 7, preferably 2 to 4, carbon atoms; n is an integer from 2 to 10, and m is one or 2, preferably one.

Phosphorous-containing compounds having vinyl unsaturation are preferred over such compounds having allylic unsaturation, with monoesters of phosphinic, phosphonic and phosphoric acids having one unit of vinyl or allylic, especially vinyl, unsaturation presently being preferred. Representative phosphorus-containing compounds include, without limitation, 2-hydroxyethyl methacrylate phosphate; bis-(2-methacryloyloxyethyl) phosphate; 2-acryloyloxyethyl phosphate; bis-(2-acryloyloxyethyl) phosphate; methyl-(2-methacryloyloxyethyl) phosphate; ethyl methacryloyloxyethyl phosphate; methyl acryloyloxyethyl phosphate; ethyl acryloyloxyethyl phosphate; compounds of the above formula wherein $R^8$ is hydrogen or methyl and $R^9$ is propyl, isobutyl, ethylhexyl, halopropyl, haloisobutyl or haloethylhexyl; vinyl phosphonic acid; cyclohexene-3-phosphonic acid; alpha-hydroxybutene-2 phosphonic acid; 1-hydroxy-1-phenylmethane-1,1-diphosphonic acid; 1-hydroxy-1-methyl-1-diphosphonic acid: 1-amino-1 phenyl-1,1-diphosphonic acid; 3-amino-1-hydroxypropane-1,1-diphosphonic acid; amino-tris(methylenephosphonic acid); gamma-aminopropylphosphonic acid; gamma-glycidoxypropylphosphonic acid; phosphoric acid-mono-2-aminoethyl ester; allyl phosphonic acid; allyl phosphinic acid; β-methacryloyloxyethyl phosphinic acid; diallylphosphinic acid; β-methacryloyloxyethyl) phosphinic acid and allyl methacryloyloxyethyl phosphinic acid.

The compositions of the invention can also contain from 0 to about 10 percent by weight based on the total weight of the composition of at least one unsaturated polyester resin. Such resin esters are derived from polycarboxylic acids and polyhydric alcohols, preferably dicarboxylic acids and dihydric alcohols, with at least one of the acid and alcohol components being unsaturated. Preferably, the unsaturated polyester resin component will contain a relatively large number of double bonds and be derived from short chain aliphatic polyhydric polyols, such as ethylene glycol and 1,3-propylene glycol, and short chain unsaturated polybasic acids, such as fumaric acid and maleic acid. Such resins can contain quantities of longer chain polyols such as 1,6-hexanediol, as well as higher polybasic acids, such as adipic acid and phthalic acid.

Still further, the compositions of the invention can optionally contain from 0 to about 50 percent by weight based on the total weight of the composition of at least one polyvinyl alkyl ether. Polyvinyl alkyl ethers are well known in the art. Such ethers will preferably contain 1–8, more preferably 1–4, carbon atoms in the alkyl moiety of the ether.

The compositions of the invention can also include up to about 60, preferably not more than about 30, percent by weight based on the total weight of the composition of a pre-formed polymeric component (in addition to the polymeric materials listed above) having an intrinsic viscosity of 0.1 to 1.3 that are obtained by the polymerization of at least one (meth)acrylic, styrene, substituted (meth)acrylic and non-acrylic olefinic monomers. Exemplary additional preformed polymeric materials include poly(methyl methacrylate/n-butylacrylate/ethyl acrylate) (90/5/5); poly(n-butyl methacrylate/isobutyl methacrylate) (50/50); poly (n-butyl methacrylate); poly (ethyl methacrylate); polystyrene; poly (vinyl toluene); and poly (vinyl alkyl ethers).

The preferred composition can optionally include 0 to 40, preferably 0 to 20 weight percent, based on the total weight of the composition, of an epoxy component that can be any monomeric or polymeric compound or mixture of compounds having an average of greater than one 1,2-epoxy groups per molecule. The polymeric epoxide materials can have a number-average molecular weight of 300 to 10,000. Useful epoxy compounds are well-known and include the polyglycidyl ethers of polyhydric alcohols such as ethylene glycol, triethylene glycol, 1,2-propylene glycol, 1,5-pentanediol, 1,2,6-hexanetriol, glycerol and 2,2-bis(4-hydroxy-cyclohexyl) propane; the polyglycidyl esters of aliphatic or aromatic polycarboxylic acids such as oxalic acid, succinic acid, glutaric acid, terephthalic acid, 2,6-naphthalene dicarboxylic acid and dimerized linolenic acid; the polyglycidyl ethers of polyphenols such as bisphenol A, 1,1-bis(4-hydroxyphenyl)ethane, 1,1-bis(hydroxyphenyl) isobutane, 2,2-bis(4-hydroxy-t-butylphenyl)propane, 1,5-dihydroxynaphthalene and novolak resins; and cycloaliphatic polyglycidyl compounds.

Another optional component is up to 1 percent by weight of a waxy substance selected from the group consisting of paraffin wax, beeswax, ceresin wax and spermaceti wax.

The environmental resistance of an adhesive system made from the composition of the invention can be improved by the optional addition of 0.005 to 15, preferably 0.1 to 10, percent by weight, based on the total weight of components (a)–(e), of a mixture of a metal molybdate such as zinc molybdate, calcium molybdate, barium molybdate and/or strontium molybdate and an inert filler such as zinc phosphate, calcium phosphate, magnesium phosphate and/or calcium carbonate. Such mixtures are more fully described in U.S. Pat. No. 4,017,315.

The compositions can also optionally include polybasic lead salts of phosphorus acid and saturated and unsaturated organic dicarboxylic acids and acid anhydrides, particularly dibasic lead phthalate, monohydrous tribasic lead maleate, tetrabasic lead fumarate, dibasic lead phosphite and mixtures thereof; and zinc oxide, in an amount of about 0.1 to about 15, preferably about 1 to about 10, percent by weight, based on the total weight of the composition. These compounds can be effective in improving environmental resistance.

The room temperature-reactive initiator systems that may be employed are well-known redox couple systems. Basically, such systems comprise at least one oxidizing agent and at least one reducing agent which are co-reactive at room temperature to generate free radicals effective to initiate addition polymerization reactions and cure the adhesive.

The oxidizing agent (also known as free radical generator) should be a peroxide. Representative peroxides include, without limitation, organic peroxides, such as benzoyl peroxide, dicumyl peroxide and other diacyl peroxides, hydroperoxides such as cumene hydroperoxide and tertiary butyl hydroperoxide, peresters such as β-butylperoxybenzoate and tertiary butyl peroxide acetate, and ketone hydroperoxides such as methyl ethyl ketone hydroperoxide.

Representative reducing agents (also known as accelerators) include, without limitation, sulfinic acids; alpha-aminosulfones such as bis(tolysulfonmethyl)-benzyl amine; tertiary amines such as diisopropyl-p-toluidine, diisopropanol-p-toluidine, dimethyl aniline, dialkyl-p-halogenated aniline and dimethyl-p-toluidine; and amine-aldehyde condensation products, for example, the condensation products of aliphatic aldehydes such as butyraldehyde with primary amines such as aniline or butylamine. The use of known promoters (such as an organic salt of a transition metal, such as cobalt, nickel, manganese or iron naphthenate, copper octoate, copper acetylacetonate, iron hexoate or iron propionate) with the redox couple initiator systems can be advantageous. Preferably, the amount of reducing agent is in the range from about 0.05 to about 10, preferably about 0.1 to about 6, percent by weight of the first part that includes the curable component.

The second part of the composition can include a bonding activator that includes the peroxide oxidizing agent for the redox catalyst system. The bonding activator can include (1) from about 0.5 to about 50 percent by weight, based on total weight of bonding activator, of at least one peroxide oxidizing agent which can function as an oxidant of a redox couple initiator system; and (2) from about 30 to about 99.5 percent by weight, based on total weight of bonding activator, of a carrier vehicle. In addition, the bonding activator also can contain either the epoxy component or the phosphorus-containing compound.

The carrier vehicles that are suitable for use in the bonding activators can be a simple inert solvent or diluent such as methylene chloride, or butyl benzyl phthalate, including mixtures of such solvents or diluents. The carrier vehicle should contain no more than 5% by weight of any moiety that is reactive with the oxidizing agent at room temperature. The carrier vehicle can be a more complex mixture including at least one film-forming binder in addition to inert solvent or diluent. In this case, the film-forming binder is preferably substantially inert with respect to the oxidant that is present in the accelerator composition. A particularly preferred carrier vehicle comprising at least one film-forming binder is an admixture comprising from about 0.05 to about 50 percent by weight of, (1), at least one saturated organic polymeric film-forming binder having a glass transition temperature in the range from about 0° C. to about 150° C. or, (2), at least one polymer-in-monomer syrup as described herein; and from about 40 to about 99 percent by weight of at least one organic solvent capable of maintaining the film-forming binder, phosphorus-containing compound when incorporated into the bonding activator composition, and oxidizing agent as a stable solution or dispersion. Among the polymeric film-forming binder materials that can be employed in the carrier vehicle are, without limitation, polyalkylacrylates and methacrylates and copolymers thereof, polystyrene and copolymers thereof, vinyl polymers and copolymers, polyesters, polyketones, polysulfones, phenolic resins, polyvinyl butyrals and polycarbonates. The carrier vehicle can contain, in addition to solvent or solvent and film-forming binder, additives such as external plasticizers, flexibilizers, suspenders and stabilizers, providing that any such additives do not unacceptably adversely affect the stability of the activator composition.

Another optional component is 0.01 to 10, preferably 0.5 to 5, percent by weight, based on the total weight of components (a)–(e), of tertiary amines represented by the structure

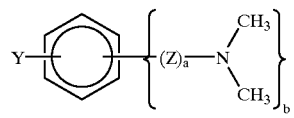

wherein Z is methylene; Y is selected from the group consisting of hydrogen, hydroxy, amino, halogen, alkyl having 1 to 8, preferably 1 to 4, carbon atoms, and alkoxy having 1 to 8, preferably 1 to 4, carbon atoms; a is 0 or 1; and b is 1 or 2.

This tertiary amine is advantageous in accelerating the cure of such compositions containing the unsaturated organophosphorus compounds. Especially preferred tertiary amines are N,N-dimethyl aniline and N,N-dimethylaminomethylphenol.

Adhesion strength of adhesive compositions that include trifunctional olefinic compound-capped polymers may be improved by including an additional crosslinker in the composition such as divinyl benzene (in the instance wherein divinyl benzene is not the primary polymerizable monomer).

The components of the composition are mixed together by means well known in the art. The catalyst, of course, is not activated until curing of the composition is desired.

The adhesive systems preferably are provided as multi-pack adhesive systems where one package contains the polymerizable component and the reducing agent and a second package contains the bonding activator, with the two packages being mixed at the time of use. The capped polymer of the invention can be included in either part of the two part system. However, capped polybutadienes preferably are not in the same part as a benzoyl peroxide oxidizing agent.

It is necessary that the epoxy compound when incorporated into the adhesives be kept separate from compounds having acidic moieties, such as the phosphorus-containing compound and methacrylic acid to inhibit premature reaction between these components. Thus, in such cases, prior to using the compositions, one package will contain the phosphorus-containing compound and the other package will contain the epoxy component. Preferably, the epoxy component will be incorporated into the bonding activator that contains the oxidizing agent of the redox couple initiator system, with the phosphorus-containing compound being incorporated into the package containing the polymerizable component. While other multipack systems are available, e.g., the bonding activator can contain the reducing agent of the redox couple catalyst system and the epoxy resin with the oxidizing agent and polymerization inhibitors being incorporated into the package containing the polymerizable adhesive mass, they are less preferable with respect to shelf stability. After mixing the individual packages, one or both surfaces to be joined are coated with the mixed adhesive system and the surfaces are placed in contact with each other.

Generally, the composition systems include the first and second parts in conventional amounts, for example, in a volume ratio of about 24:1 to about 1:1, preferably about 10:1 to about 1:1, first part:second part. An additional advantage of the invention is that many of the capped polymers according to the invention are low viscosity and are not reactive with a benzoyl oxidizing agent and, thus, could be used to provide a 1:1 volume mix ratio.

The adhesive systems may be used to bond together any types of substrate surfaces. The adhesive is particularly useful for bonding metal surfaces, such as steel, aluminum and copper, to a variety of substrates, including metal, plastics, and other polymers, reinforced plastics, fibers, glass, ceramics, wood and the like. It is a feature of the present invention that the herein-described adhesive compositions can be employed to bond metal substrates such as steel, aluminum and copper with little, if any, pretreatment of the metal surface prior to application of the adhesive. Thus, bonding can be effected even to oily metal surfaces which are otherwise clean without an extensive pretreatment as is usually required with the vast majority of currently available primers and adhesives. Additionally, the adhesive systems of this invention provide effective bonding at room temperature, thus heat is not required either for applying the adhesive systems to the substrates or for curing.

The capped polymer of the invention could also be included as a toughening agent in a polystyrene composition that is useful to make plastics and composites. The capped polymer could be dissolved in styrene and then formulated into the final composition. Other uses for the capped polymer include resins for fiberglass-reinforced composites. Thermosetting resins are commonly reinforced with glass fiber and used to prepare molded articles. The most common resins are unsaturated polyesters dissolved in styrene. The unsaturated functionality in the polyester copolymerizes with the styrene to form a rigid crosslinked strengthened and toughened by the presence of the embedded glass fiber. The capped oligomer would also react with the styrene to provide additional crosslinking. Fiberglass-reinforced molded articles include boat hulls, bathtubs, shower stalls and construction panels.

Embodiments of the invention will be described in more detail by way of the following examples. "BZCY" in the formulas of the examples represents the following capping moiety:

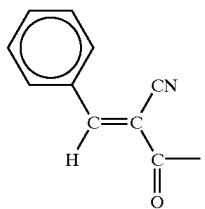

EXAMPLE 1

Capped Propylene Oxide 1455.2 g of a propylene oxide oligomer capped with ethylene oxide to provide a primary hydroxyl group (commercially available from BASF under the trade designation PLURACOL HP1250D), 444.80 g methyl benzylidenecyanoacetate (synthesized according to the method of Gilath et al (cited above)), and 9.68 g dibutyl tin oxide (commercially available from Elf-Atochem under the trade designation FASCAT 4201) were charged to a flask fitted with an oil bath for heating. The oil bath was heated to 160° C. for a period of 31 hours. The resulting oligomer was a viscous liquid that included capped hydroxyl groups as represented below.

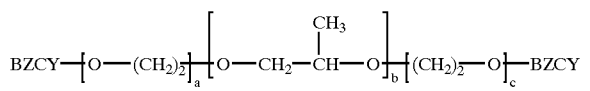

An adhesive composition was made by mixing 42.75 g of the benzylidenecyanoacetate-capped PLURACOL HP1250D, 42.75 g vinyl toluene, 1.40 g diisopropanol-p-toluidine, 0.60 g dimethyl aniline, and 5.00 g silica to form side A. 7.50 g benzoyl peroxide initiator was mixed with side A. and immediately thereafter the resulting adhesive was applied to five fiber-reinforced polyester 1"×4" coupons that were bonded together to form lap shear joints as per ASTM D-1002-94. The lap shear joints were allowed to fully cure overnight and then tested according to ASTM D-1002-94. The joints exhibited an average strength of 570 psi and a failure mode of 60% fiber tear and 40% adhesive failure (failure modes are defined in ASTM 5573-94).

EXAMPLE 2

Capped Poly(tetramethylene glycol)

A mixture of 126.35 g hydroxy-treminated-poly (tetramethylene glycol) (commercially available from Air Products under the trade designation VERSILINK PTMEG 200), 23.65 g methyl benzylidenecyanoacetate and 0.77 g dibutyl tin oxide (FASCAT 4102) where heated under a nitrogen atmosphere in a 140° C. oil bath for six hours. The resulting oligomer was a waxy solid that included capped hydroxyl groups as represented below.

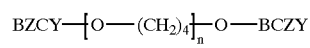

An adhesive composition was made from the same components as in Example 1 except that benzylidenecyanoacetate-capped poly(tetramethylene glycol) was substituted for benzylidenecyanoacetate-capped PLURACOL HP1250D. The adhesive composition was applied to fiber-reinforced polyester coupons and lap shear joints were bonded and tested as described in Example 1. The joints exhibited an average strength of 196 psi and a mostly cohesive failure mode (in other words, the fracture surface is through the middle of the adhesive layer, with no failure at the adhesive-substrate interface).

EXAMPLE 3

Adhesive

A benzylidenecyanoacetate-capped PLURACOL HP1250D was made as described in Example 1. An adhesive composition was made by mixing 39.25 weight percent of the benzylidenecyanoacetate-capped PLURACOL HP1250D, 39.25 weight percent vinyl toluene, 4.00 weight percent of the reaction product of caprolactone, phosphorus pentoxide and 2-hydroxyethylacrylate (commercially available from Nippon Kayaku Co. under the trade designation KAYAMER PM 21), 3.00 weight percent divinyl benzene, 1.40 weight percent diisopropanol-p-toluidine, 0.60 weight percent dimethyl aniline and 5.00 weight percent silica to form side A. 7.50 weight percent benzoyl peroxide initiator then was mixed with side A and immediately thereafter the resulting adhesive was applied to five steel coupons that were bonded together to form lap shear joints as per ASTM D-1002-94. The lap shear joints were allowed to fully cure overnight and then tested according to ASTM D-1002-94. The joints exhibited an average strength of 1241 psi and an adhesive failure mode (in other words, the adhesive failed before any destruction of the steel). Weight percents are based on the total amount of sides A and B.

EXAMPLE 4

Adhesive with Divinyl Benzene

An adhesive composition was made by mixing 41.25 weight percent of the benzylidenecyanoacetate-capped PLURACOL HP1250D of Example 1, 41.25 weight percent vinyl toluene, 3.00 weight percent divinyl benzene, 1.40 weight percent diisopropanol-p-toluidine, 0.60 weight percent dimethyl aniline and 5.00 weight percent silica to form side A. 7.50 weight percent benzoyl peroxide initiator then was mixed with side A and immediately thereafter the resulting adhesive was applied to five fiber reinforced polyester 1"×4" coupons that were bonded together to form lap shear joints as per ASTM D-5868-95. The lap shear joints were allowed to fully cure overnight and then tested according to ASTM D-5868-95. The joints exhibited an average strength of 1050 psi and a failure mode of 100% fiber tear that is better than the results obtained in Example 1 without divinyl benzene. Weight percents are based on the total amount of sides A and B.

EXAMPLE 5

Adhesive with Styrene Substituted for Vinyl Toluene

An adhesive composition was made by mixing 42.75 weight percent of the benzylidenecyanoacetate-capped PLURACOL HP1250D of Example 1, 42.75 weight percent styrene, 1.40 weight percent diisopropanol-p-toluidine, 0.60 weight percent dimethyl aniline and 5.00 weight percent silica to form side A. 7.50 weight percent benzoyl peroxide initiator then was mixed with side A and immediately thereafter the resulting adhesive was applied to five fiber reinforced polyester 1"×4" coupons that were bonded together to form lap shear joints as per ASTM D-5868-95. The lap shear joints were allowed to fully cure overnight and then tested according to ASTM D-5868-95. The joints exhibited an average strength of 887 psi and a failure mode of 80% fiber tear. Weight percents are based on the total amount of sides A and B.

EXAMPLE 6

Adhesive on Different Substrates

An adhesive composition was made by mixing 54.00 weight percent of the benzylidenecyanoacetate-capped PLURACOL HP1250D of Example 1, 36.00 weight percent 3(4)-methylstyrene (mixed isomer), 1.40 weight percent diisopropanol-p-toluidine, 0.60 weight percent dimethyl aniline, 3.00 weight percent divinyl benzene and 5.00 weight percent silica to form side A. Side A had a flash point of 136–140° F. 7.50 weight percent benzoyl peroxide initiator then was mixed with side A and immediately thereafter the resulting adhesive was applied to the different substrates listed below and lap shear joints were bonded and tested as described in Example 1.

| Substrate type | Adhesive Strength (psi) |
| --- | --- |
| Polypropylene | 68 |
| Polycarbonate[1] | 636 |
| Plexiglass | 521 |
| Sheet molded composite[2] | 485 |
| Sheet molded composite[3] | 267 |
| Dicyclopentadiene fiberglass-reinforced panel[4] | 518 |
| Fiberglass-reinforced plastic[5] | 432 |
| Acrylonitrile-butadiene-styrene[6] | 264 |
| Modified poly(phenylene oxide)-polystyrene blend[7] | 294 |
| Vinyl ester fiberglass-reinforced plastic[8] | 568 |
| Ortho-phthalate resin fiberglass-reinforced plastic[9] | 747 |
| Steel | 512 |
| Aluminum | 386 |

[1]LEXAN available from General Electric
[2]951 available from Budd Co.
[3]A-7 available from Premix
[4]Resin available from Owens-Corning
[5]GPO-3 available from McMaster/Carr
[6]CYCOLAC T available from General Electric
[7]NORYL 731 available from General Electric
[8]CORVE 8117 available from Interplastics Company
[9]GLS 1001 available from GLS Corporation

EXAMPLE 7

Capped Silicone

A mixture of 182.88 g hydroxy-terminated polydimethylsiloxane (commerically available from United Chemical Technologies under the trade designation PS555-KG), 17.13 g methyl benzylidenecyanoacetate and 1.00 g dibutyl tin oxide (FASCAT 4102) were heated under a nitrogen atmosphere in a 140° C. oil bath 41 hours. The resulting capped polymer had a structure represented by:

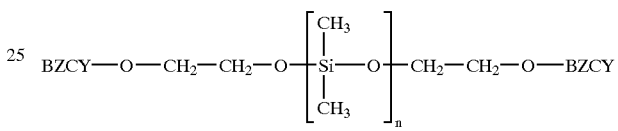

EXAMPLES 8A and 8B

Fumarate

An adhesive composition 8A was made by mixing 36.00 weight percent of the benzylidenecyanoacetate-capped PLURACOL HP1250D of Example 1, 54.00 weight percent vinyl toluene, 3.00 weight percent divinyl benzene, 1.40 weight percent diisopropanol-p-toluidine, 0.60 weight percent dimethyl aniline and 5.00 weight percent silica to form side A. Benzoyl peroxide initiator then was mixed with side A in a 1:10 weight ratio and immediately thereafter the resulting adhesive was applied to five fiber reinforced polyester 1"×4" coupons that were bonded together to form lap shear joints as per ASTM D-5868-95. The lap shear joints were allowed to fully cure overnight and then tested according to ASTM D-5868-95. The joints exhibited an average strength of 713 psi and a failure mode of 40% adhesive and 60% fiber tear. Weight percents are based on the total amount of side A.

An adhesive composition 8B was made by mixing 34.80 weight percent of the benzylidenecyanoacetate-capped PLURACOL HP1250D of Example 1, 52.20 weight percent vinyl toluene, 3.00 weight percent mono-ethyl fumarate, 3.00 weight percent divinyl benzene, 1.40 weight percent diisopropanol-p-toluidine, 0.60 weight percent dimethyl aniline and 5.00 weight percent silica to form side A. Benzoyl peroxide initiator then was mixed with side A in a 1:10 weight ratio and immediately thereafter the resulting adhesive was applied to five fiber reinforced polyester 1"×4" coupons that were bonded together to form lap shear joints as per ASTM D-5868-95. The lap shear joints were allowed to fully cure overnight and then tested according to ASTM D-5868-95. The joints exhibited an average strength of 784 psi and a failure mode of 100% fiber tear. Weight percents are based on the total amount of side A. A comparison of Examples 8A and 8B indicates that the composition that included the fumarate exhibited superior adhesive strength.

EXAMPLE 9

Capped Polybutadiene

A mixture of 519.03 g hydroxy-terminated polybutadiene (available from Elf Atochem under the trade designation R45-HT), 80.97 g methyl benzylidenecyanoacetate and 2.50 g dibutyl tin oxide was heated in 125° C. oil bath for 5.5 hours to produce a capped polymer having a structure represented below:

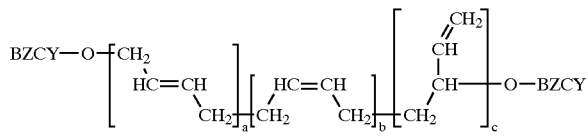

What is claimed is:

1. An adhesive composition comprising (a) at least one ethylenically unsaturated compound, (b) a polymer having at least one reactive terminal or pendant functional group that has been capped with a trifunctional olefinic compound having a structure represented by:

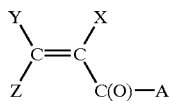

wherein A represents said polymer; X is an electron withdrawing group; Y is —$R^1$, —Ar or an electron withdrawing group; and Z is a moiety selected from the first or second row elements of the Periodic Chart in the form of either a single element or linearly bonded multiple elements; and $R^1$ is an alkyl, alkoxy, alkyl ether, alkenyl, alkyl ester, amino, alkylamino, alkylimino, or alkylamimidoyl, wherein Ar is an aryl or substituted aryl group, and (c) a room temperature-active initiator system.

2. An adhesive composition according to claim 1 wherein the ethylenically unsaturated compound is selected from a styrenic compound, a vinyl ether and a conjugated diene.

3. An adhesive composition according to claim 2 wherein the ethylenically unsaturated compound comprises a styrenic monomer.

4. An adhesive composition according to claim 1 wherein the ethylenically unstaturated compound comprises a styrenic monomer.

5. An adhesive composition according to claim 1 further comprising an additional component (d) comprising divinyl benzene.

6. An adhesive composition according to claim 1 wherein the composition is substantially 100% reactive.

7. A two part adhesive composition including:
   (a) a first part comprising:
      (i) at least one free radical-curable ethylenically unsaturated monomer;
      (ii) a polymer having at least one reactive terminal or pendant functional group that has been capped with a trifunctional olefinic compound having a structure represented by:

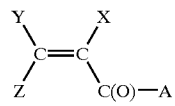

wherein A represents said polymer; X is an electron withdrawing group; Y is —$R^1$,—Ar or an electron withdrawing group; and Z is a moiety selected from the first or second row elements of the Periodic Chart in the form of either a single element or linearly bonded multiple elements; and $R^1$ is an alkyl, alkoxy, alkyl ether, alkenyl, alkyl ester, amino, alkylamino, alkylimino, or alkylamimidoyl, wherein Ar is an aryl or substituted aryl group; and
   (iii) at least one reducing agent that is interactive with a peroxide oxidizing agent to produce free radicals; and
   (b) a second part comprising a bonding activator that includes a peroxide oxidizing agent.

8. A polymer according to claim 1 wherein the electron withdrawing group is —$SO_2R^1$, —CN, $SO_2Ar$, —(C=O)$R^2$, or halogen (wherein Ar is an aryl group; $R^1$ is an alkyl alkoxy, alkyl ether, alkenyl, alkyl ester, amino, alkylamino, alkylimino, or alkylamimidoyl; and $R^2$ is an alkyl, —N(H)$R^1$, or —$NH_2$).

9. A polymer according to claim 1 wherein X is —CN; Y is —CN or —Ar; Z is hydrogen and $R^1$ is a primary or secondary alkyl having 1 to 18 carbon atoms.

10. A polymer according to claim 1 wherein the trifunctional olefinic compound comprises a benzylidenecyanoacetate.

11. A polymer according to claim 1 wherein the reactive terminal or pendant functional group of the polymer is selected from at least one of hydroxyphenyl, hydroxy or amino.

12. A polymer according to claim 1 wherein the polymer having the reactive terminal or pendant functional group is selected from polyether polyol, hydroxy-terminated diene, hydroxy-terminated silicone, hydroxy-terminated polyester, amine-terminated polyether, polymer or copolymer of 2-hydroxy(meth)acrylate, poly(vinyl alcohol), poly(vinyl acetal), poly(vinyl phenol), cellulose, chitin or oligomerized castor oil.

13. The adhesive composition according to claim 7 wherein the electron withdrawing group is —$SO_2R^1$, —CN, $SO_2Ar$, —(C=O)$R^2$, or halogen (wherein Ar is an aryl group; $R^1$ is an alkyl, alkoxy, alkyl ether, alkenyl, alkyl ester, amino, alkylamino, alkylimino, or alkylamimidoyl; and $R^2$ is an alkyl, —N(H)$R^1$, or —$NH_2$).

14. The adhesive composition according to claim 7 wherein X is —CN; Y is —CN or —Ar; Z is hydrogen and $R^1$ is a primary or secondary alkyl having 1 to 18 carbon atoms.

15. The adhesive composition according to claim 7 wherein the trifunctional olefinic compound comprises a benzylidenecyanoacetate.

16. The adhesive composition according to claim 7 wherein the reactive terminal or pendant functional group of the polymer is selected from at least one of hydroxyphenyl, hydroxy or amino.

17. The adhesive compostion according to claim 7 wherein the polymer having the reactive terminal or pendant functional group is selected from polyether polyol, hydroxy-terminated diene, hydroxy-terminated silicone, hydroxy-terminated polyester, amine-terminated polyether, polymer or copolymer of 2-hydroxy(meth)acrylate, poly(vinyl alcohol), poly(vinyl acetal), poly(vinyl phenol), cellulose, chitin or oligomerized castor oil.

* * * * *